(12) United States Patent
Nakayama

(10) Patent No.: US 6,522,034 B1
(45) Date of Patent: Feb. 18, 2003

(54) SWITCHING CIRCUIT AND MULTI-VOLTAGE LEVEL POWER SUPPLY UNIT EMPLOYING THE SAME

(75) Inventor: Masashi Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 58 days.

(21) Appl. No.: 09/654,568

(22) Filed: Sep. 1, 2000

(30) Foreign Application Priority Data

Sep. 3, 1999  (JP) .......................................... P11-250589

(51) Int. Cl.[7] .............................................. H01H 35/00
(52) U.S. Cl. ........................ 307/130; 307/10.1; 307/31
(58) Field of Search ........................... 307/10.1, 11, 18, 307/31, 130; 318/293

(56) References Cited

U.S. PATENT DOCUMENTS

| | | | |
|---|---|---|---|
| 4,481,452 A | * 11/1984 | Kitano et al. ................ | 318/293 |
| 4,553,511 A | * 11/1985 | Hayakawa et al. ... | 123/146.5 B |
| 4,723,105 A | * 2/1988 | Matouka et al. ............... | 307/16 |
| 4,765,426 A | * 8/1988 | Shimizu ..................... | 180/446 |
| 4,896,084 A | * 1/1990 | Maue et al. ................. | 318/256 |
| 4,992,672 A | * 2/1991 | Norton ....................... | 307/10.1 |
| 5,184,300 A | * 2/1993 | Hara et al. .................. | 123/479 |
| 5,198,697 A | * 3/1993 | Loth ......................... | 307/10.1 |
| 5,572,098 A | * 11/1996 | Dreon et al. ................ | 307/10.1 |
| 5,595,674 A | * 1/1997 | Kim .......................... | 219/715 |
| 5,760,555 A | * 6/1998 | Yamano et al. ............. | 318/293 |
| 5,892,340 A | * 4/1999 | Sasajima et al. ............ | 318/286 |
| 5,920,165 A | * 7/1999 | Winston ..................... | 318/280 |
| 5,990,644 A | * 11/1999 | Furuya et al. .............. | 257/546 |
| 5,994,853 A | * 11/1999 | Ribbe .......................... | 318/16 |
| 6,316,892 B1 | * 11/2001 | Valencia ..................... | 318/293 |
| 6,345,364 B1 | * 2/2002 | Lee ............................ | 713/324 |

FOREIGN PATENT DOCUMENTS

| | | |
|---|---|---|
| JP | 53-28364 | 3/1978 |
| JP | 56-116238 | 9/1981 |
| JP | 59-221921 | 12/1984 |

OTHER PUBLICATIONS

Derwent–Acct–No: 1999–505161, Title: Multivoltaage level electric power converter, Pub Date: Aug. 10, 1999, Japan Application No. 0019538.*

* cited by examiner

*Primary Examiner*—Brian Sircus
*Assistant Examiner*—Sharon Polk
(74) *Attorney, Agent, or Firm*—Finnegan, Henderson, Farabow, Garrett & Dunner, L.L.P.

(57) ABSTRACT

A multi-voltage level power supply unit has a constant voltage source for providing a first voltage, a switching circuit connected to the constant voltage source and a DC/DC converter for reducing the first voltage so as to provide the second voltage. The first voltage may be 42-volts and the second voltage may be 14-volts, for example. The switching circuit is connected to the constant voltage source. And the switching circuit has a first relay designed to operate at the second voltage lower than the first voltage, a first semiconductor device and a control unit (CPU). Namely, the first semiconductor device has a first control electrode (base electrode), a first main electrode (emitter electrode) for receiving the first voltage, a second main electrode (collector electrode) connected to the first relay. And the CPU is connected to the first control electrode. The CPU provides a first control signal to the first control electrode so as to increase an interelectrode voltage between the first and second main electrodes, only during transition periods between open to closed states and closed to open states. Further the CPU provides second control signal to the first control electrode so as to decrease the interelectrode voltage during steady state periods of the first relay. The constant voltage source is constructed of an alternator and an AC/DC converter connected to the alternator.

20 Claims, 6 Drawing Sheets

SWITCHING CIRCUIT AND MULTI-VOLTAGE LEVEL POWER SUPPLY UNIT EMPLOYING THE SAME

BACKGROUND OF THE INVENTION

1. Field of the Invention

The present invention relates to a multi-voltage level power supply unit and a switching circuit employed in the power supply unit.

2. Description of the Related Art

Vehicles such as automobiles have a power supply unit for supplying loads with currents. Such a power supply unit supplies a load with the output voltage of a 14-volt power supply via the drain electrode D and the source electrode S of a field effect transistor (FET).

One of the known power supply unites is a multi-voltage level power supply unit shown in FIG. 1. As shown in FIG. 1, an AC voltage generated by an alternator 121 is converted by an AC/DC converter 122 into a DC voltage, which is then transferred to a 42-volt power supply B1. The output of the 42-volt power supply B1 is supplied to a load 123 such as a driving motor. The DC voltage output of the 42-volt power supply B1 is lowered by a DC/DC converter 125 and transferred to a 14-volt power supply B2 of which the output is supplied to a load 127 such as a lamp. By the multi-voltage levels provided with the 42-volt power supply B1 and the 14-volt power supply B2, both the 42-volt system load 123 such as a driving motor and the 14-volt system load 127 such as a lamp can be driven.

The voltage output of the 42-volt power supply B1 is substantially three times greater than that of the 14-volt power supply B2 and its current is as small as ⅓. This permits the wire harness (W/H) in the 42-volt system circuit to be substantially ⅓ smaller in the diameter than that in the 14-volt system circuit. Accordingly, the W/H can be reduced in the weight and its load efficiency will be improved. For that reason, it is increasingly desired to activate a number of loads with the 42-volt power supply B1 in every vehicle. In case that the motor is driven by the 42-volt power supply B1 through a relevant relay, the use of a 42-volt system relay may increase the cost. It is hence desired to drive the motor with the 42-volt power supply B1, but using a 14-volt system relay.

However, when the 14-volt system relay is connected directly with the 42-volt power supply B1, it receives a too-high voltage and may generate an arc discharge (a spark) upon opening or closing, thus causing unwanted worn-out or meltdown on the contact.

For preventing the worn-out or meltdown of the contact so as to extend the life of the relay, an ON/OFF control circuit employing a semiconductor device and a relay is proposed in Japanese Patent Laid-open Publication S59-221921. The ON/OFF control circuit has, as shown in FIG. 2, a driver 205, an AND circuit 209, the semiconductor device 206 and the relay 207 connected in series with each other, and a timing circuit 208 for controlling the timing of switching on and off the semiconductor device 206 as well as the timing of turning on and off the relay 207. The relay 207 is activated for turning on or off after the semiconductor device 206 is changed to the off state by the timing circuit 208. In this circuit, the semiconductor device 206 is driven to off state before turning on and off the relay 207, so that a flow of large current through the contact of the relay 207 can be suppressed. Accordingly, the life of tile relay 207 can be extended.

For suppressing the arc discharge in the relay so as to prevent the worn-out or meltdown on the contact, a switching apparatus is proposed in Japanese Patent Laid-open Publication S56-116238. The switching apparatus has, as shown in FIG. 3, an electromagnetic relay 302 having normally open contacts 302a, 302b, 302c and a triac 305 connected in series with the normally open contact 302b. The switching apparatus further has a normally-open push-button switch 303 and a normally-closed push-button switch 304 connected in series with the electromagnetic relay 302. It is so set that, when the normally-open push-button switch is closed to flow current in the electromagnetic relay 302, the normally open contact 302b closes first, and the normally open contact 302c closes so as to conduct the triac 305. On the contrary, the normally open contact 302c opens first to cut off the triac 305, and the normally open contact 302b opens afterwards, when the normally-closed push-button switch 304 becomes open so as to cut off the current in the electromagnetic relay 302, thus minimizing melting-down or worn-out of the contact 302b.

SUMMARY OF THE INVENTION

It is therefore an object of the present invention to provide a switching circuit in which a reverse electromotive force possibly generated on a load, which will be connected to a relay serving as a component of the switching circuit, can be minimized, even if the load is an inductive load such as a motor.

Another object of the present invention is to provide a switching circuit in which a voltage applied to the relay for closing and opening operations is effectively lowered so as to allow a configuration of a multi-voltage level power supply unit, in which higher and lower voltages are supplied.

Still another object of the present invention is to provide a switching circuit in which generation of arc discharge on the relay designed to operate at lower rated voltage can be minimized even in the multi-voltage level power supply unit.

Still another object of the present invention is to provide a switching circuit in which the relay designed to operate at lower rated voltage can be operated with higher supply voltage without using any specific and complicated mechanism or apparatus designed to operate at the higher voltage.

Still another object of the present invention is to provide a multi-voltage level power supply unit in which the relay, designed to operate at lower rated voltage, can be operated with the higher voltage without using a specific mechanism or apparatus by suppressing the generation of arc discharge.

Still another object of the present invention is to provide a multi-voltage level power supply unit in which the relay, designed to operate at the lower rated voltage, can be operated with the higher voltage without giving any damage, fracture, or breakdown to the semiconductor device, which may be employed in the unit, when it is switched off.

For accomplishing the foregoing objects, the present invention is implemented by the following manners. A first aspect of the present invention inheres in a switching circuit for use in a multi-voltage level power supply unit for supplying a first voltage and a second voltage lower than the first voltage. Namely, the switching circuit of the present invention has a first relay designed to operate at the second voltage, a first semiconductor device and a control unit. The first semiconductor device has a first control electrode, a first main electrode for receiving the first voltage, a second main electrode connected to the first relay. And the control unit is connected to the first control electrode of the first semiconductor device. The control unit provides a first control signal to the first control electrode so as to increase an interelectrode voltage between the first and second main electrodes, only during transition periods between open to closed states and closed to open states. Further the control unit provides second control signal to the first control electrode so as to decrease the interelectrode voltage during steady state periods of the first relay. The first semiconductor device of the present invention is always operating in its on state, but the operation point of the first semiconductor device swings between the higher and lower interelectrode voltages.

In the first aspect of the present invention, the first semiconductor device may be a bipolar transistor (BJT), a field effect transistor (FET), a static induction transistor (SIT), insulated gate bipolar transistor (IGBT), etc. For example, if the first semiconductor device is the BJT, the first control electrode is a base electrode, the first main electrode may be emitter or collector electrode. And the second main electrode is collector or emitter electrode other than the first main electrode. Then the interelectrode voltage between the first and second main electrodes is the emitter-collector voltage. If the first semiconductor device is the FET, the first control electrode is a gate electrode, the first main electrode may be source or drain electrode. And the second main electrode is drain or source electrode opposing to the first main electrode. Then the interelectrode voltage between the first and second main electrodes is the source-drain voltage.

In the switching circuit employed in a vehicle, the first voltage may be 42-volts and the second voltage may be 14-volts, for example. However, the switching circuit of the present invention is not limited to a 42-volt/14-volt power supply but may be at any other rates.

According to the first aspect, when the first relay is scheduled to be closed, the control unit increases the interelectrode voltage to a level greater than the interelectrode voltage with the first relay remaining closed in the steady state period, and then closes the first relay. And, when the first relay is scheduled to be open, the control unit increases interelectrode voltage to a level greater than the interelectrode voltage with the first relay remaining open in the steady state period and then opens the first relay. This allows the voltage to be applied to the first relay to be significantly lowered to a level smaller than the first voltage, before the first relay is driven to opened and closed states.

Accordingly, the reverse electromotive force possibly generated on a load, which will be connected to the first relay, can be minimized, even if the load is an inductive load such as a motor, hence preventing fracture, breakdown, or damage of the first semiconductor device. Also, as the voltage applied to the first relay for triggering the closing and opening operations is effectively lowered, the generation of arc discharge on the first relay designed to operate at the second voltage can be minimized. Further, the first relay designed to operate at the second voltage can be operated with the first power supply without using any specific and complicated mechanism designed to operate at the first voltage.

A second aspect of the present invention inheres in a multi-voltage level power supply unit having a constant voltage source for providing a first voltage, a switching circuit connected to the constant voltage source and a DC/DC converter for reducing the first voltage so as to provide the second voltage. The first voltage may be 42-volts and the second voltage may be 14-volts, for example. Here the switching circuit is connected to the constant voltage source supplying the first voltage, or the higher voltage. And the switching circuit has a first relay designed to operate at the second voltage, a first semiconductor device and a control unit, similarly to the first aspect of the present invention. Namely the first semiconductor device has a first control electrode, a first main electrode for receiving the first voltage, a second main electrode connected to the first relay. And the control unit is connected to the first control electrode. The control unit provides a first control signal to the first control electrode so as to increase an interelectrode voltage between the first and second main electrodes, only during transition periods between open to closed states and closed to open states. Further the control unit provides second control signal to the first control electrode so as to decrease the interelectrode voltage during steady state periods of the first relay.

According to the second aspect of the present invention, when the first relay is scheduled to be closed, the control unit increases the interelectrode voltage to a level greater than the interelectrode voltage with the first relay remaining closed and then closes the first relay. And, when the first relay is scheduled to be open, the control unit increases the interelectrode voltage to a level greater than the interelectrode voltage with the first relay remaining open and then opens the first relay. This allows the voltage to be applied to the first relay to be significantly lowered to a level smaller than the first voltage, before the first relay is driven to opened and closed states. Accordingly the reverse electromotive force possibly generated on a load, which will be connected to the first relay, can be minimized, even if the load is an inductive load such as a motor, hence preventing fracture, breakdown, or damages of the semiconductor device. Also, as the voltage applied to the first relay for triggering the closing and opening operations is effectively lowered, the generation of arc discharge on the first relay designed to operate at the second voltage can be minimized. Simultaneously, the first relay designed to operate at the second voltage can be operated with the first power supply without using any specific mechanism designed to operate at the first voltage.

DETAILED DESCRIPTION OF THE PREFERRED EMBODIMENTS

Figure 1:
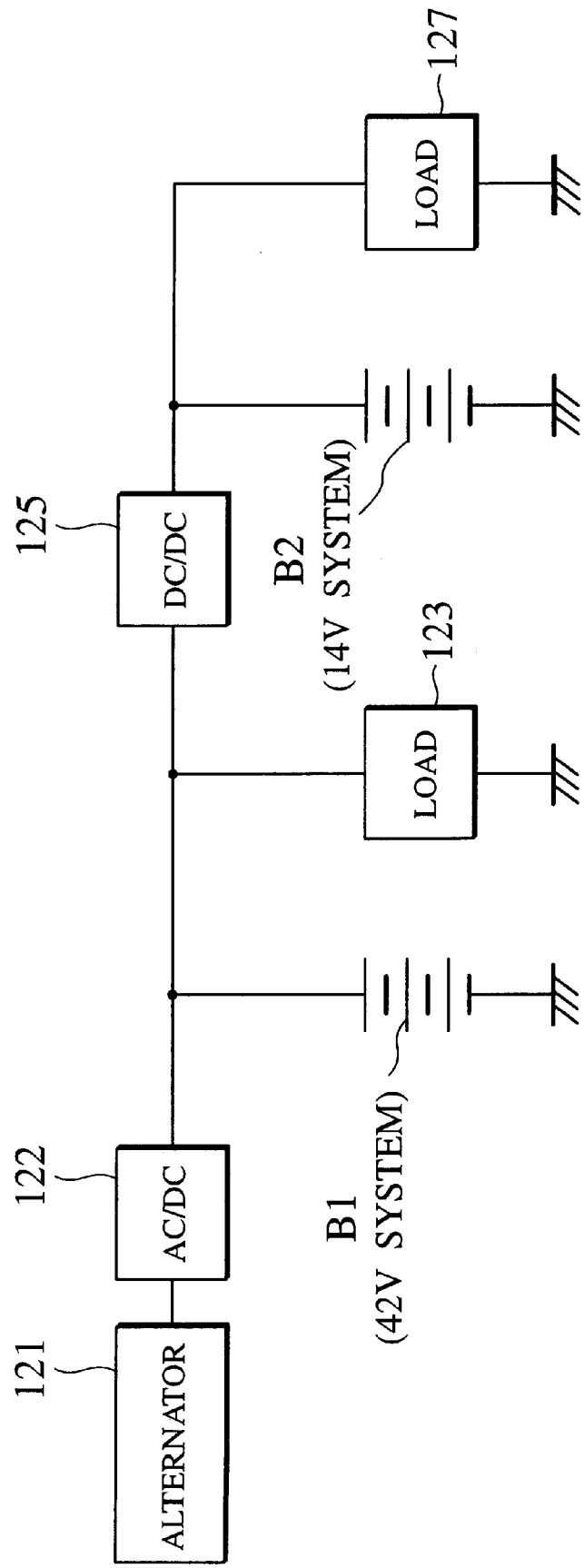
FIG. 1 is a circuit configuration of a conventional multi-voltage level power supply unit.
Figure 2:
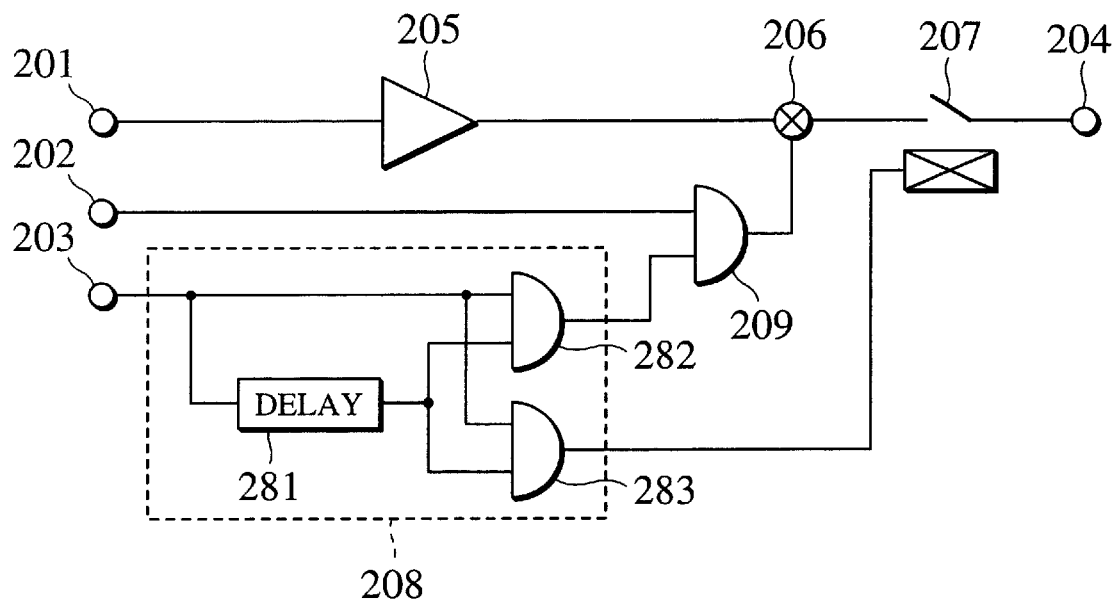
FIG. 2 is a circuit configuration of a known ON/OFF control circuit for the semiconductor device and the relays.
Figure 3:
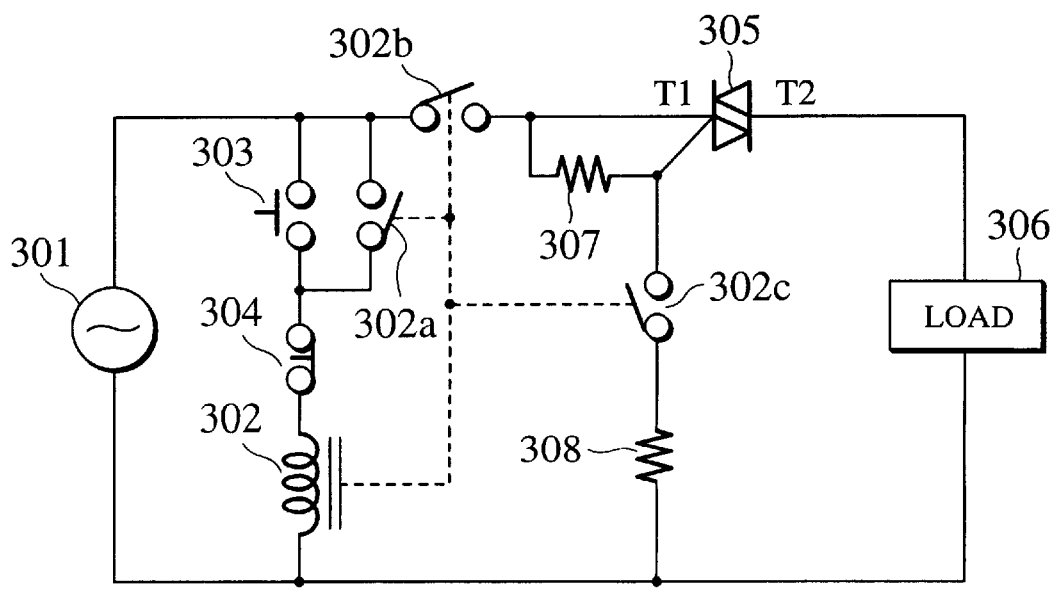
FIG. 3 is a circuit configuration of a known switching apparatus.

A comparative example and a preferred embodiment will be described with reference to the accompanying drawings.

It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a through understanding of the present invention. However, it will be obvious to those skilled in the art that the present invention may be practiced without such specific details. In other instances, well-known circuits have been shown in block diagram form in order not to obscure the present invention in unnecessary detail.

COMPARATIVE EXAMPLE

A comparative example of the multi-voltage level power supply unit shown in FIG. 4 will be described firstly. The power supply unit is applied to a power window unit in the vehicle for opening and closing a window, not shown, with the forward and reverse rotating movements of a motor 25. The power supply unit comprises a first relay 21a, a second relay 21b, the motor 25 connected to the relays 21a and 21b, a bipolar transistor TR1 connected on the upstream of the relays for receiving a first ON/OFF signal at its base electrode, a bipolar transistor TR2 for receiving a second ON/OFF signal at its base electrode, and a bipolar transistor TR3 for receiving a third ON/OFF signal at its base electrode. In particular, the emitter electrode of the bipolar transistor TR1 and one ends of electromagnetic coils 22a and 22b are connected with 42-volt power supply B1.

In the power supply unit of the Comparative example, when it is desired to activate the first relay 21a and the second relay 21b for operating the motor 25, the second ON signal is applied to the base electrode of the bipolar transistor TR2 firstly. After the bipolar transistor TR2 is turned on, the first electromagnetic coil 22a is fed with a magnetizing current thus driving the first contactor 23a to come into direct contact with the second terminal b, i.e. turning on the first relay 21a. Then, the first ON signal is applied to the base electrode of the bipolar transistor TR1. As the bipolar transistor TR1 is turned on, a current from the 42-volt power supply B1 runs through the bipolar transistor TR1, the first relay 21a, the motor 25, the second relay 21b, and the ground. Consequently, the motor 25 is rotated, for example, in the forward direction.

When it is desired to activate the first relay 21a and the second relay 21b for halting the motor 25, the first OFF signal is applied to the base electrode of the bipolar transistor TR1, firstly. After the bipolar transistor TR1 is turned off, the second OFF signal is applied to the base electrode of the bipolar transistor TR2. As the bipolar transistor TR2 is turned off, the magnetizing current through the first electromagnetic coil 22a is shut off to allow the first contactor 23a to return back to the first terminal a, i.e. turning off the first relay 21a. As the first relay 21a is turned off, the current to the motor 25 is cut off, hence stopping the rotation of the motor 25.

As described above, the bipolar transistor TR1 triggers the opening and closing operation of the relays. The turning off of the bipolar transistor TR1 can prevent the 42-volt power supply B1 from connecting directly to both the first relay 21a and the second relay 21b. Accordingly, the generation of arc discharge on the first relay 21a or the second relay 21b can be minimized.

Figure 4:
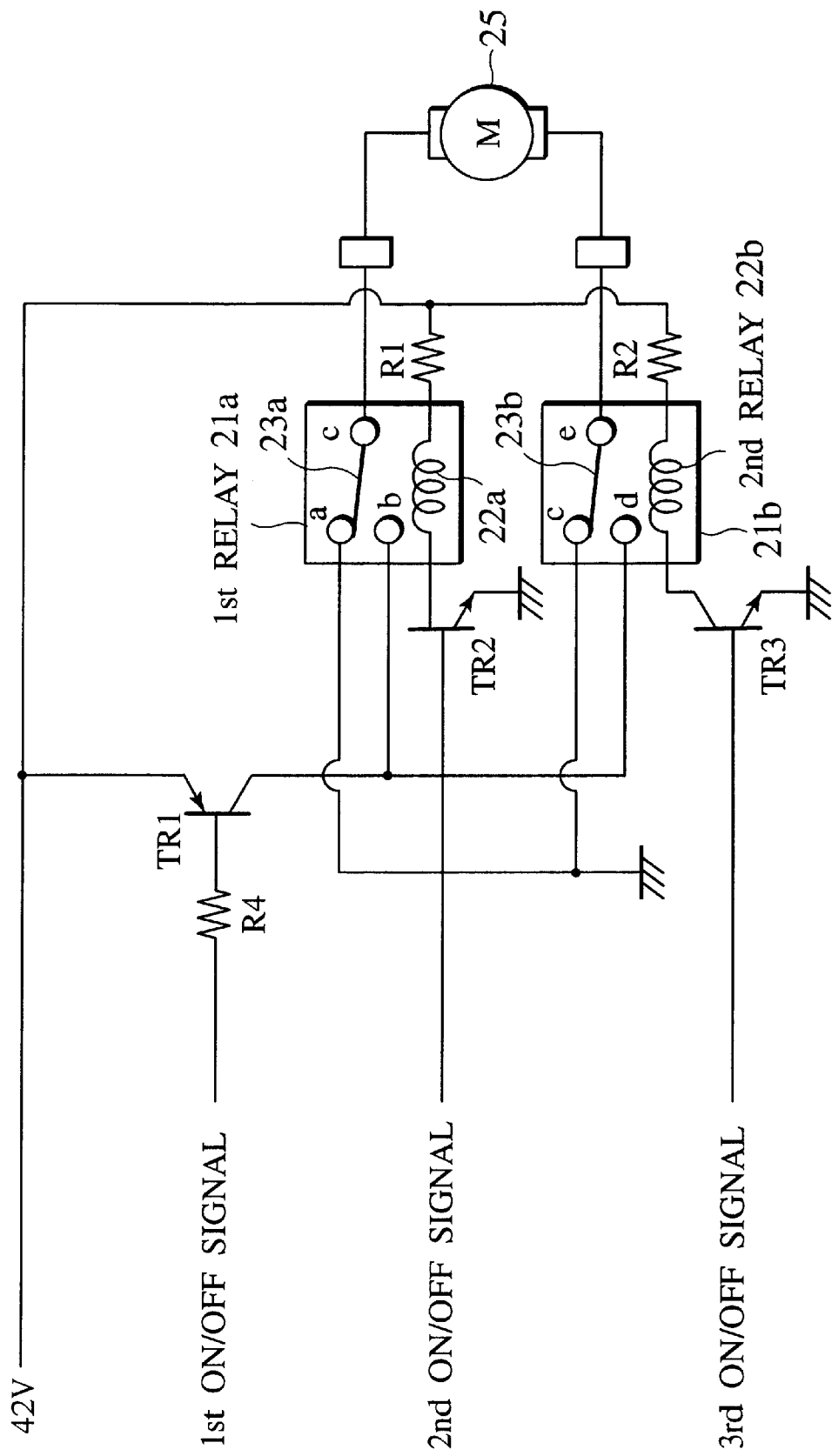
FIG. 4 is a circuit configuration of a multi-voltage level power supply unit including a semiconductor device and a relay according to a comparative example of the present invention.

However, in the power supply unit employing the bipolar transistor TR1 as shown in FIG. 4, when the bipolar transistor TR1 connected at the upstream of the relays is simply changed from the on state to the off state to activate the inductive load, or the motor, its switching off operation may generate a reverse electromotive force. The reverse electromotive force may cause damages, fracture, or breakdown of the bipolar transistor TR1 in the comparative example.

(An Embodiment)

In this embodiment, the power supply unit is designed for supplying electric power to a power window mechanism of a vehicle. A motor 25, or a power window driving motor, is provided for lifting up and down the window glass of the vehicle. It is assumed that the motor 25 is driven for forward and backward rotation.

Figure 5:
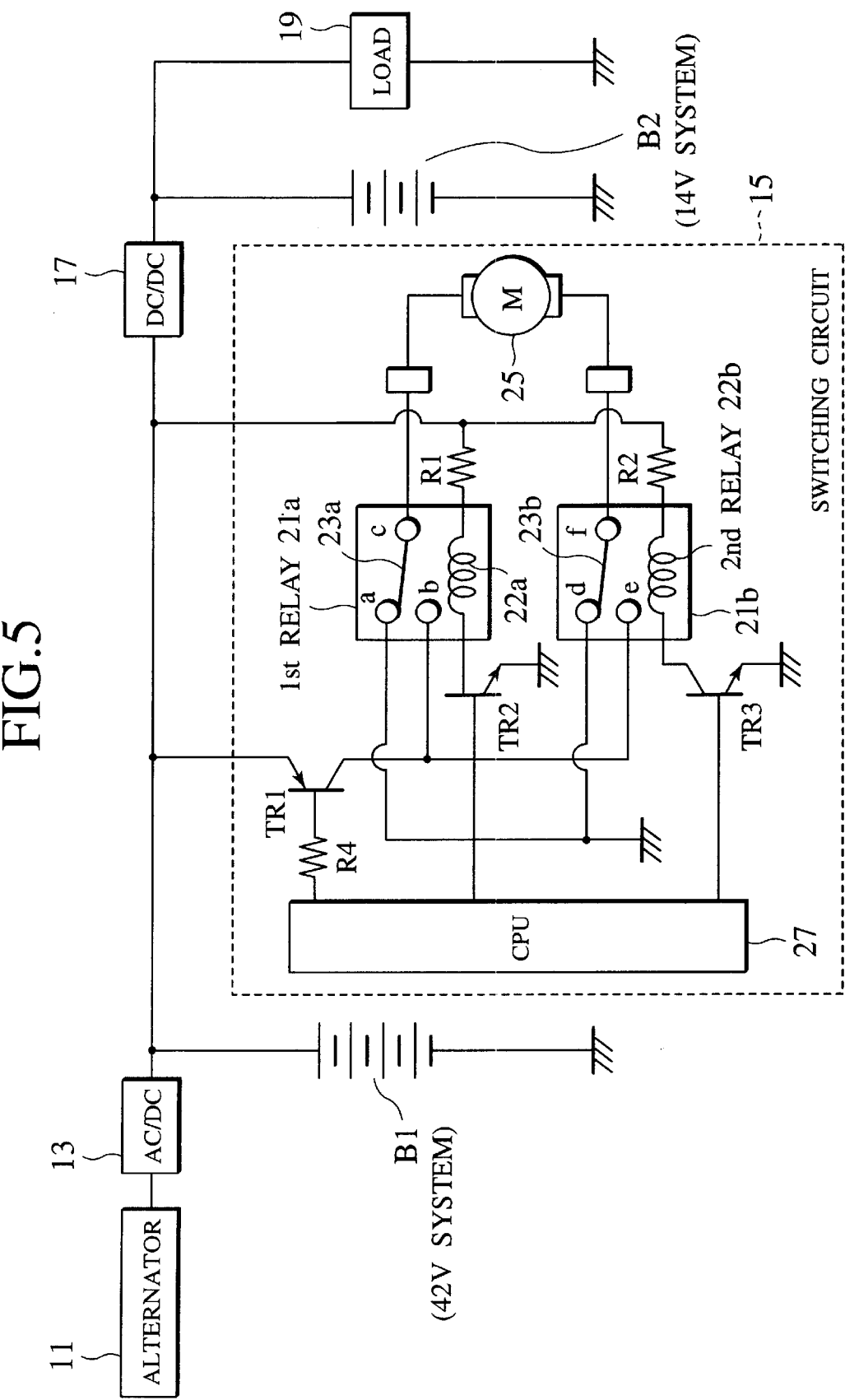
FIG. 5 is a circuit configuration of a power supply unit according to a preferred embodiment of the present invention.

As shown in FIG. 5, the multi-voltage level power supply unit of the present invention has a constant voltage source (11, 13, B1) for providing a first voltage of 42 volts, a switching circuit 15 connected to the constant voltage source (11, 13, B1) and a DC/DC converter 17 for reducing the first voltage so as to provide the second voltage of 14 volts. Here the switching circuit 15 is connected to the constant voltage source (11, 13, B1) supplying the first voltage, or the higher voltage. And the switching circuit 15 has a first relay 21a designed to operate at the second voltage or at 14 volts, a first semiconductor device TR1 and a control unit 27, the control unit 27 is a central processing unit (CPU). The first semiconductor device TR1 is a bipolar transistor (BJT) having a first control electrode (base electrode), a first main electrode (emitter electrode), for receiving the first voltage, a second main electrode (collector electrode), connected to the first relay 21a. And the control unit (CPU) 27 is connected to the first control electrode (base electrode) of the first semiconductor device TR1. The constant voltage source (11, 13, B1) has an alternator 11 for generating AC voltage, an AC/DC converter 13 for converting the AC voltage generated by the alternator 11 to DC voltage, a 42-volt power supply B1 which is charged with the DC voltage from the AC/DC converter 13. A 14-volt power supply B2 is charged with the DC voltage from the DC/DC converter 17.

In the preferred embodiment of the present invention, a load 19 is connected to the 14-volt power supply B, so as to be driven by the 14-voltage power supply B2. Accordingly, while the switching circuit 15 is driven by the 42-volt power supply B1, the load 119 such as a 14-volt system lamp is driven by the 14-volt power supply B2.

The details of the circuit configuration of the switching circuit 15 are then explained. The 42-volt power supply B1 is connected to the emitter electrode (the first main electrode) of a bipolar transistor TR1, which serves as the first semiconductor device. The base electrode (the first control electrode) of the bipolar transistor TR1 is supplied with a first control signal $Vb_1$ and a second control signal $Vb_2$, both are fed via a resistor R4 from the control unit 27, or the CPU 27. The first control signal $Vb_1$ and the second control signal $Vb_2$ construct a first ON/OFF signal, although the bipolar transistor (the first semiconductor device) TR1 of the present invention is always operating in its on state. However the first ON/OFF signal of the present invention controls the positions of the operation point of the first semiconductor device, namely the operation point is so controlled to swing between the higher and lower interelectrode voltages (emitter-collector voltages).

The collector electrode (the second main electrode) of the bipolar transistor TR1 is connected to a second terminal b of a first relay 21a designed to operate at the rating voltage from the 14-volt power supply B2 and a fourth terminal e of a second relay 21b designed to operate at the rating voltage from the 14-volt power, supply B2.

The first relay 21a comprises la first electromagnetic coil 22a, a first contactor 23a, a first common terminal c joined to one end of the first contactor 23a, and a first terminal a and the second terminal b, both can be in contact with the other end of the first contactor 23a. The second relay 21b comprises a second electromagnetic coil 22b, a second contactor 23b, a second common terminal f joined to one end of the second contactor 23b, and a third terminal d and the fourth terminal e, both can be in contact with the other end of the second contactor 23b.

The motor 25, which serves as a load, is connected at one end to the first common terminal c of the first relay 21a and at the other end to the second common terminal f of the second relay 21b. Both the first terminal a of the first relay 21a and the third terminal d of the second relay 21b are grounded.

The first electromagnetic coil 22a is connected at one end via a resistor R1 to the positive terminal of the 42-volt power supply B1 and at the other end to the collector electrode (the third main electrode) of a bipolar transistor TR2 serving as a second semiconductor device. The base electrode (the second control electrode) of the bipolar transistor TR2 is connected to the CPU 27 for receiving a second ON/OFF signal from the CPU 27 while its emitter electrode (the fourth main electrode) is grounded. Similarly, the second electromagnetic coil 22b is connected at one end via a resistor R2 to the positive terminal of the 42-volt power supply B1 and at the other end to the collector electrode (the fifth main electrode) of a bipolar transistor TR3 serving as a third semiconductor device. The base electrode (the third control electrode) of the bipolar transistor TR3 is connected to the CPU 27 for receiving a third ON/OFF signal from the CPU 27 while its emitter electrode (the sixth main electrode) is grounded.

The resistance of the resistor R1 is substantially equal to the winding resistance of the first electromagnetic coil 22a while the resistance of the resistor R2 is substantially equal to the winding resistance of the second electromagnetic coil 22b. This permits the two electromagnetic coils 22a and 22b to be applied with about 21 volts, a half of 42 volts.

The CPU 27 is adapted, when the first relay 21a is scheduled to be closed, to increase the interelectrode voltage, or the emitter-collector voltage of the bipolar transistor TR1 to a level higher than the emitter-collector voltage of the bipolar transistor TR1 with the first relay 21a being closed and then turn on the first relay 21a. And the CPU 27 is adapted, when the first relay 21a is scheduled to be closed, to increase the emitter-collector voltage of the bipolar transistor TR1 to a level higher than the emitter-collector voltage of the bipolar transistor TR1 with the first relay 21a being open and then turn off the first relay 21a.

More specifically, when the first relay 21a is changed from the closed state to the open state or from the open state to the closed state, i.e. during transition period, the first control signal $Vb_1$ is supplied from the CPU 27 to the base electrode of the bipolar transistor TR1 for driving the bipolar transistor TR1 in its active region. When the first relay 21a is in its closed state or its open state, i.e. during steady state period, the second control signal $Vb_2$ which is greater than the first control signal $Vb_1$ is supplied from the CPU 27 to the base electrode of the bipolar transistor TR1 for driving the bipolar transistor TR1 in its saturation region.

It is essential, for driving the bipolar transistor TR1 in its saturation region, that the input voltage is applied to the base electrode of such a level that the loss in the bipolar transistor TR1 is minimized, configured that the emitter-collector voltage of the bipolar transistor TR1 can be reduced to substantially zero. For driving the bipolar transistor TR1 in its active region, it is necessary to supply the base electrode with such a level of voltage that the emitter-collector voltage of the bipolar transistor TR1 becomes about 28 volts so that the first relay 21a is applied with voltage of about 14 volts.

Figure 6:
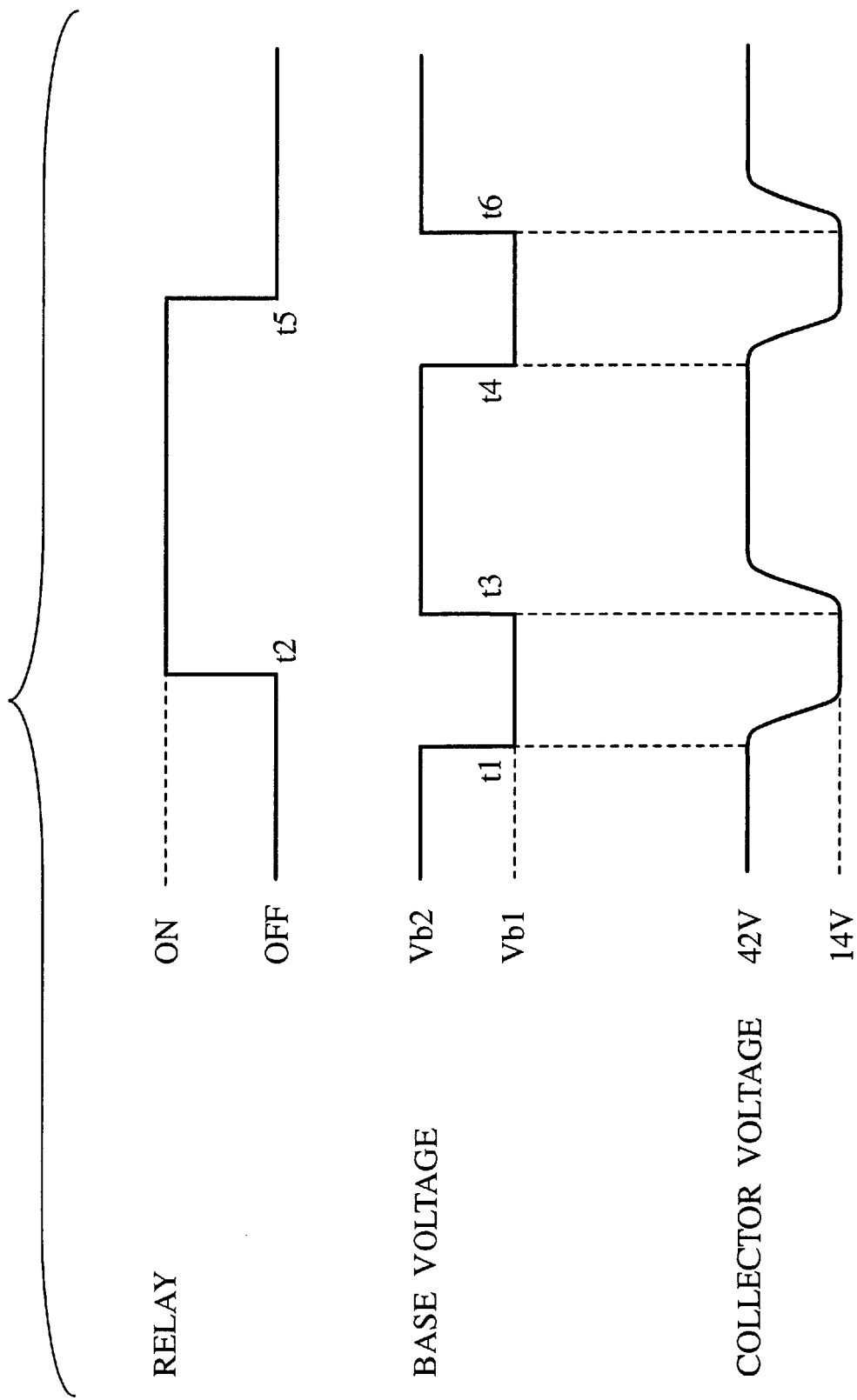
FIG. 6 is a timing chart showing a relationship between the input signal and the collector voltage of a semiconductor device, and further showing the operation of a relay provided in the power supply unit of the embodiment.

The operation of the power supply unit having the above described arrangement will be described referring to the circuit configuration shown in FIG. 5 and the timing chart shown in FIG. 6.

(a) While the motor 25 is brought to a halt, i.e. before the time $t_1$, the first relay 21a is turned off and the base electrode (the first control electrode) of the bipolar transistor TR1 is supplied with the second control signal $Vb_2$ from the CPU 27, allowing the bipolar transistor (the first semiconductor device) TR1 to operate in its saturation region. This reduces the emitter-collector voltage of the bipolar transistor TR1 to be substantially zero. Although the first relay 21a is applied with the voltage from the 42-volt power supply B1, it is in its off state and no particular problem may be involved.

(b) At the time ti for operating the motor 25, the first control signal $Vb_1$ that is smaller than the second control signal $Vb_2$ is applied from the CPU 27 to the base electrode of the bipolar transistor TR1. As the bipolar transistor TR1 is turned to be operated in its active region, the emitter-collector voltage of the bipolar transistor TR1 becomes to about 28 bolts. More particularly, the voltage at the 42-volt power supply B1 is decreased by a drop of emitter-collector voltage of the bipolar transistor TR1, thus limiting the voltage at the collector electrode (the second main electrode) of the bipolar transistor TR1 to about 14 volts.

(c) Then, at the time $t_2$, the bipolar transistor (the second semiconductor device) TR2 receives at its base electrode (the second control electrode) the second ON signal from the CPU 27 and is then turned on. This permits a magnetizing current to flow across the first electromagnetic coil 22a which thus drives the first contactor 23a to come into direct contact with the second terminal b, hence turning on the first relay 21a. Accordingly, the first relay 21a is applied with the limited voltage (14 volts in this embodiment), whereby the generation of arc discharge at the turning on of the first relay 21a will be decreased.

(d) At the time $t_3$, the bipolar transistor TR1 is fed at its base electrode with the second control signal $Vb_2$ from the CPU 27 and turned to be operated in its saturation region. The flow of current from the 42-volt power supply B1 runs through the bipolar transistor TR1, the first relay 21a, the motor 25, and the second relay 21b to the ground, causing the motor 25 to rotate in, e.g., the forward direction. At the time, as the motor 25 is supplied with about 42 volts, it can be driven by the 42-volt power supply B1.

(e) At the time $t_4$ for halting the, motor 25, the first control signal $Vb_1$ is fed from the CPU 27 to the bipolar transistor TR1. As the bipolar transistor TR1 turned to be operated in its active region, its emitter-collector voltage becomes about 28 volts. More specifically, the voltage at the 42-volt power supply B1 is decreased by a drop of emitter-collector voltage of the bipolar transistor TR1, thus limiting the voltage at the collector electrode of the bipolar transistor TR1 to about 14 volts. As the motor 25 is applied with as a small voltage as 14 volts,1 the reverse electromotive force, which is possibly generated on the motor 25, or an inductive load will be minimized, hence avoiding fracture or breakdown of the bipolar transistor TR1.

(f) At the time $t_5$, the second OFF signal from the CPU 27 is applied to the base electrode of the bipolar transistor TR2 which is thus turned off, blocking the magnetizing current to the first electromagnetic coil 22a. Accordingly, the first contactor 23a returns back to the first terminal a. At the time, the first relay 21a is applied with the limited voltage (14 volts in this embodiment), the generation of arc discharge at the turning off of the first relay 21a will be minimized.

(g) Then, at the time $t_6$, the CPU 27 feeds the second control signal $Vb_2$ to the base electrode of the bipolar transistor TR1 which is thus turned into its saturation region. As the first relay 21a remains turned off, the motor 25 is disconnected from the power supply and its rotating operation stops.

As described above, the power supply unit of the embodiment allows the reverse electromotive force, which is possibly generated on the inductive load such as a motor, to be minimized, thus preventing fracture, breakdown, or damage of the bipolar transistor TR1. Also, since the voltage applied to the relay at its opening or closing operation is successfully decreased, the generation of arc discharge on the first relay 21a designed to operate at the rating voltage from the 14-volt power supply B2 can be minimized and favorably, the first relay 21a designed to operate at the rating voltage from the 14-volt power supply B2 can be operated with the 42-volt power supply B1 without being modified to a specific type applicable to the power of the 42-volt power supply B1.

The above description is based on the forward direction of the motor 25 for which the first relay 21a is turned on and off while the second relay 21b remains turned off (as connected to the ground). For the reverse rotation of the motor 25, the CPU 27 is controlled to turn on and off the second relay 21b while maintaining the first relay 21a at its off state (as connected to the ground). The reverse rotating operation of the motor 25 is now explained.

(a) If we suppose that the motor 25 is halted before the time $t_1$, the second relay 21b is off state, and the second control signal $Vb_2$ from the CPU 27 is being supplied to the base electrode of the bipolar transistor TR1 so as to drive the bipolar transistor TR1 in its saturation region.

(b) For starting the operation of the motor 25 at the time $t_1$, the first control signal $Vb_1$ is fed from the CPU 27 to the bipolar transistor TR1. Then, the bipolar transistor TR1 is turned into the active region.

(c) At the time $t_2$, the third ON signal from the CPU 27 is applied to the base electrode (the third control electrode) of the bipolar transistor (the third semiconductor device) TR3. As the bipolar transistor TR3 is turned on, the magnetizing current flows through the electromagnetic coil driving the second contactor 23b to come into direct contact with the fourth terminal e for turning on the second relay 21b. As the second layer 21b is applied with the limited voltage (14 volts in this embodiment), the generation of arc discharge on the second relay 12b can be minimized.

(d) At the time $t_3$, the bipolar transistor TR1 is fed at its base electrode with the second control signal $Vb_2$ from the CPU 27 and turned into its saturation region. The flow of current from the 42-volt power supply B1 then runs through the bipolar transistor TR1, the second relay 21b, the motor 25, and the first relay 21a to the ground, causing the motor 25 to rotate in the reverse direction. Alt the time, as the motor 25 is supplied with about 42 volts, it can be driven by the 42-volt power supply B1.

(e) At the time $t_4$ for halting the motor 25, the first control signal $Vb_1$ is fed from the CPU 27 to the bipolar transistor TR1. As the bipolar transistor TR1 is turned into its active region, the motor 25 receives as a small voltage as of 14 volts. Accordingly, the reverse electromotive force possibly generated on the inductive load or the motor 25 is minimized thus avoiding fracture, breakdown, or damage of the bipolar transistor TR1.

(f) At the time $t_5$, the third OFF signal from the CPU 27 is applied to the base electrode of the bipolar transistor TR3 which is thus turned off, blocking the magnetizing current to the second electromagnetic coil 22b. Accordingly, the second contactor 23b returns back to the third terminal d. At the time, the second relay 21b is applied with the limited voltage (14 volts in this embodiment), the generation of arc discharge at the turning off of the second relay 21b will be minimized.

(g) Then, at the time $t_6$, the CPU 27 feeds the second control signal $Vb_2$ to the base electrode of the bipolar transistor TR1 which is thus turned into its saturation region. As the first relay 21b remains turned off, the motor 25 is disconnected from the power supply and its rotating operation stops.

As stipulated, the second relay 12b designed to operate at the rating voltage from the 14-volt power supply B2 can be operated with the 42-volt power supply B1. Also, with the motor 25 rotating in the reverse direction, the same effectiveness as of the motor 25 rotating in the forward direction will be obtained.

Figure 7:
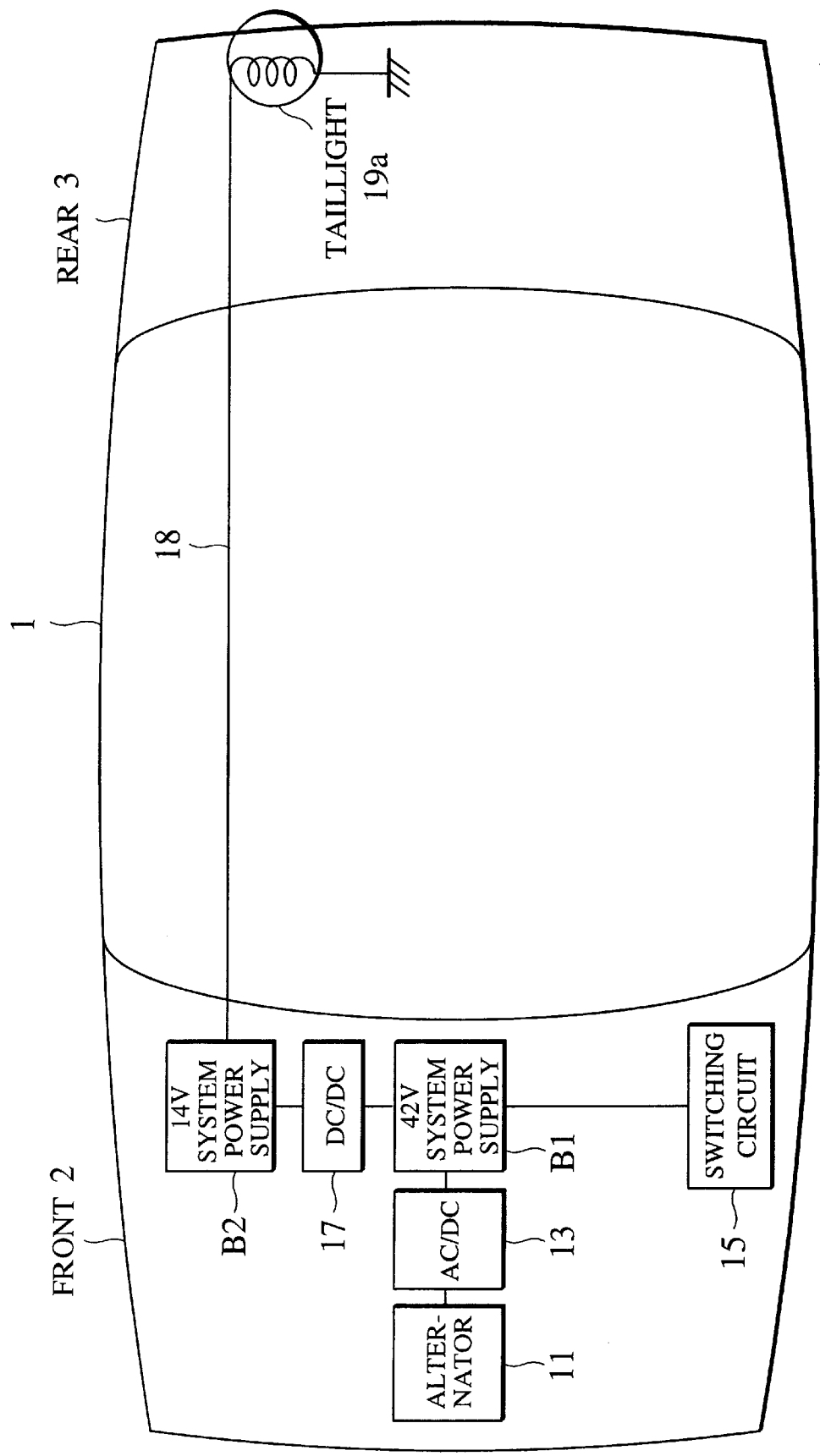
FIG. 7 is a schematic view showing the power supply unit according to the embodiment mounted in a vehicle.

An example of the power supply unit mounted to a vehicle will now be described referring to FIG. 7. As shown in FIG. 7, the vehicle 1 carries at its front section 2 an alternator 11 driven by an engine not shown for generating AC voltage, an AC/DC converter 13, a 42-volt power supply B1, a DC/DC converter 17, and a 14-volt power supply B2. Also, provided at a rear section 3 of the vehicle 1 is a taillight 19a connected via an electric line 18 to the 14-volt power supply B2.

In the power supply unit of the embodiment mounted to the vehicle 1, the 14-volt system relay can equally be operable with the 42-volt power supply without using any particular 42-volt system relay and giving any damage to the bipolar transistor TR1 which serves as the first semiconductor device. In addition, the wire harness involved can be minimized in the diameter and the weight. Consequently, the power supply unit will significantly be decreased in the cost and the overall dimensions as made simpler in the arrangement.

The power supply unit of the embodiment is illustrated as but not limited to a component in a power window unit. It may be applicable to a wiper unit with equal success.

It is understood that the present invention is not limited to the embodiment of the power supply unit. Although the bipolar transistor TR1 serving as the first semiconductor device is located on the upstream side of the first relay 21a and the second relay 21b, it may be provided on the downstream side of the first relay 21a and the second relay 21b.

The power supply unit of the embodiment includes bipolar transistors as the first, second and third semiconductor devices. The bipolar transistors may be replaced by field effect transistors (FETs), static induction transistors (SITs), insulated gate bipolar transistors (IGBTs), etc. For example, if the first semiconductor device is the FET, it is preferable that a first control signal from the CPU 27 turns into the FET in a saturation regime (also known as linear regime active regime, or pentode regime) during a transition period so as to increase an interelectrode voltage between the first main electrode (source electrode) and second main electrode (drain electrode). And, second control signal from the CPU 27 turns into the FET in an ohmic regime (also known as triode regime, or nonsaturated regime) during the steady state periods so as to decrease the interelectrode voltage during the steady state period of the first relay.

The power supply in the embodiment is not limited to a 42-volt power supply and a 14-volt power supply but may be at any other rates. Other changes and modifications will be possible without departing from the technical aspects of the present invention.

What is claimed is:

1. A switching circuit for use in a multi-voltage level power supply unit for supplying a first voltage and a second voltage lower than the first voltage, the switching circuit comprising:
   a first relay designed to operate at the second voltage during transition periods between open to closed states and closed to open states, configured to control a load current;
   a first semiconductor device having a first control electrode, a first main electrode for receiving the first voltage, a second main electrode connected to the first relay, configured to conduct the load current from the first main electrode to the second main electrode so as to supply the load current to the first relay so that the load current can be controlled by the first relay; and
   a control unit connected to the first control electrode for, during the transition periods of the first relay, providing a first control signal to the first control electrode so as to generate a first on-state interelectrode voltage between the first and second main electrodes, the first on-state interelectrode voltage corresponding to a difference between the first and second voltages, and providing a second control signal to the first control electrode so as to generate a second on-state interelectrode voltage lower than the first on-state interelectrode voltage during steady state periods of the first relay.

2. The switching circuit of claim 1, wherein said first semiconductor device is a bipolar transistor.

3. The switching circuit of claim 2, wherein said first control signal turns into the bipolar transistor in an active region during the transition periods.

4. The switching circuit of claim 2, wherein said second control signal turns into the bipolar transistor in a saturation region during the steady state periods.

5. The switching circuit of claim 1, wherein said first semiconductor device is a field effect transistor.

6. The switching circuit of claim 5, wherein said first control signal turns into the field effect transistor in a saturation regime during the transition periods.

7. The switching circuit of claim 6, wherein said second control signal turns into the field effect transistor in an ohmic regime during the steady state periods.

8. The switching circuit of claim 1, further comprises a motor connected to said first relay, the motor having first and second terminal.

9. The switching circuit of claim 8, wherein said first relay having:
   a first common terminal connected to the first terminal of said motor;
   a first contactor connected to the first common terminal at one end;
   a first contact terminal connected to the ground;
   a second contact terminal connected to the first semiconductor device; and
   a first electromagnetic coil neighboring to the first contactor so as to swing another end of the first contactor to select one of the first and second contact terminals.

10. The switching circuit of claim 9, further comprises a second semiconductor device having:
    a second control electrode connected to said control unit;
    a third main electrode connected to said first electromagnetic coil; and
    a fourth main electrode connected to ground.

11. The switching circuit of claim 10, further comprises:
    a second relay having:
        a second common terminal connected to the second terminal of said motor;
        a second contactor connected to the second common terminal at one end;
        a third contact terminal connected to the ground;
        a fourth contact terminal connected to the first semiconductor device; and
        a second electromagnetic coil neighboring to the second contactor so as to swing another end of the second contactor to select one of the third and fourth contact terminals; and
    a third semiconductor device having:
        a third control electrode connected to said control unit;
        a fifth main electrode connected to said second electromagnetic coil; and
        a sixth main electrode connected to ground.

12. A multi-voltage level power supply unit comprising:
    a constant voltage source for providing a first voltage;
    a switching circuit connected to the constant voltage source, the switching circuit comprising:
        a first relay designed to operate at a second voltage lower than the first voltage during transition periods between open to closed states and closed to open states, configured to control a load current;
        a first semiconductor device having a first control electrode, a first main electrode for receiving the first voltage, a second main electrode connected to the first relay, configured to conduct the load current from the first main electrode to the second main electrode so as to supply the load current to the first relay so that the load current can be controlled by the first relay; and
        a control unit connected to the first control electrode for, during the transition periods of the first relay, providing a first control signal to the first control electrode so as to generate a first on-state interelectrode voltage between the first and second main electrodes, the first on-state interelectrode voltage corresponding to a difference between the first and second voltages, and providing a second control signal to the first control electrode so as to generate a second on-state interelectrode voltage lower than the first on-state interelectrode voltage during steady state periods of the first relay; and
    a DC/DC converter configured to convert the first voltage to the second voltage.

13. The multi-voltage level power supply unit of claim 12, wherein said first semiconductor device is a bipolar transistor.

14. The multi-voltage level power supply unit of claim 13, wherein said first control signal turns into the bipolar transistor in an active region during the transition periods.

15. The multi-voltage level power supply unit of claim 13, wherein said second control signal turns into the bipolar transistor in a saturation region during the steady state periods.

16. The multi-voltage level power supply unit of claim 13, wherein said constant voltage source comprises:
   an alternator; and
   an AC/DC converter connected to the alternator.

17. The multi-voltage level power supply unit of claim 12, further comprises a motor connected to said first relay, the motor having first and second terminal.

18. The multi-voltage level power supply unit of claim 17, wherein said first relay having:
   a first common terminal connected to the first terminal of said motor;
   a first contactor connected to the first common terminal at one end;
   a first contact terminal connected to the ground;
   a second contact terminal connected to the first semiconductor device; and
   a first electromagnetic coil neighboring to the first contactor so as to swing another end of the first contactor to select one of the first and second contact terminals.

19. The multi-voltage level power supply unit of claim 18, further comprises a second semiconductor device having:
   a second control electrode connected to said control unit;
   a third main electrode connected to said first electromagnetic coil; and
   a fourth main electrode connected to ground.

20. The multi-voltage level power supply unit of claim 19, further comprises:
   a second relay having:
      a second common terminal connected to the second terminal of said motor;
      a second contactor connected to the second common terminal at one end;
      a third contact terminal connected to the ground;
      a fourth contact terminal connected to the first semiconductor device; and
      a second electromagnetic coil neighboring to the second contactor so as to swing another end of the second contactor to select one of the third and fourth contact terminals; and
   a third semiconductor device having:
      a third control electrode connected to said control unit;
      a fifth main electrode connected to said second electromagnetic coil; and
      a sixth main electrode connected to ground.

* * * * *